United States Patent
Wight et al.

(10) Patent No.: US 6,890,609 B2
(45) Date of Patent: May 10, 2005

(54) INK-JET RECEPTOR SHEET CONTAINING NITRILE POLYMER

(75) Inventors: Paul Wight, Manchester (GB); Philip MacFaul, Manchester (GB); Stephen George Yeates, Manchester (GB); Tom Annable, Manchester (GB)

(73) Assignee: Avecia Limited, Manchester (GB)

( * ) Notice: Subject to any disclaimer, the term of this patent is extended or adjusted under 35 U.S.C. 154(b) by 108 days.

(21) Appl. No.: 10/344,536

(22) PCT Filed: Jul. 19, 2001

(86) PCT No.: PCT/GB01/03233

§ 371 (c)(1),
(2), (4) Date: Feb. 12, 2003

(87) PCT Pub. No.: WO02/16143

PCT Pub. Date: Feb. 28, 2002

(65) Prior Publication Data

US 2003/0176566 A1 Sep. 18, 2003

(30) Foreign Application Priority Data

Aug. 18, 2000 (GB) ............................................. 0020273

(51) Int. Cl.[7] ................................................. B41M 5/40

(52) U.S. Cl. ................................ 428/32.13; 428/32.16; 428/32.21; 428/32.34

(58) Field of Search .......................... 428/32.13, 32.16, 428/32.21, 32.34

(56) References Cited

U.S. PATENT DOCUMENTS

| 4,877,678 A | 10/1989 | Hasegawa et al. ........... 428/216 |
| 5,635,297 A | 6/1997 | Ogawa et al. ............... 428/342 |
| 5,928,789 A | 7/1999 | Chen et al. .................. 428/413 |
| 6,639,006 B1 * | 10/2003 | Cottrell et al. .............. 524/556 |

FOREIGN PATENT DOCUMENTS

| EP | 0 609 930 A1 | 8/1994 |
| EP | 0 747 235 A2 | 12/1996 |
| JP | 57-064591 | 4/1982 |
| WO | WO 95/13194 | 5/1995 |

* cited by examiner

Primary Examiner—B. Shewareged
(74) Attorney, Agent, or Firm—Morgan, Lewis & Bockius LLP

(57) ABSTRACT

A substrate for ink-jet printing which is coated or impregnated with a water dissipatable nitrile polymer having a Mn of less than 25,000 comprising 5 to 70% w/w of nitrile monomers. Also processes for ink-jet printing and printed substrates.

13 Claims, No Drawings

INK-JET RECEPTOR SHEET CONTAINING NITRILE POLYMER

This invention relates to ink receptive substrates which are particularly suitable for use in ink-jet printing (IJP) and to ink-jet printing methods using these substrates.

IJP is a non-impact printing technique in which droplets of ink are ejected through a fine nozzle onto a substrate without bringing the nozzle into contact with the substrate. There are many demanding performance requirements for ink-jet prints. For example they should provide sharp, non-feathered images and have good water-fastness, light-fastness and optical density. The provision of images with excellent light-fastness is particularly important in photorealistic quality printing. Prints are often exposed to daylight for long periods and there is a need for the image to have as good light-fastness as possible. To achieve an acceptable level of performance when compared to silver halide photography the nature of both the ink used to form the image and the substrate on which the image is formed must be carefully controlled. To this end we have found that the incorporation of certain nitrite polymers into substrates for IJP provides prints that exhibit enhanced light-fastness.

According to the present invention there is provided a substrate for ink-jet printing which is coated or impregnated with a water-dissipatable nitrite polymer having a Mn of less than 25,000 comprising 5 to 70% w/w of nitrile monomers.

The substrate is preferably a coated or uncoated paper, plastic, textile, metal or glass, more preferably a coated or uncoated paper, overhead projector slide or a textile material, especially a coated or uncoated paper.

Preferred papers are plain or treated papers which may have an acid, alkaline or neutral character. Examples of commercially available treated papers include HP Premium Coated Paper (available from Hewlett Packard Inc.), HP Photopaper (available from Hewlett Packard Inc.), Stylus Pro 720 dpi Coated Paper, Epson Photo Quality Glossy Film (available from Seiko Epson Corp.), Epson Photo Quality Glossy Paper (available from Seiko Epson Corp.), Canon HR 101 High Resolution Paper (available from Canon), Canon GP 201 Glossy Paper (available from Canon), and Canon HG 101 High Gloss Film (available from Canon). These papers may easily be modified to include nitrite polymer during their manufacture. For example, one may perform the process described in PPG's U.S. Pat. No. 5,880,196, Example 1, or U.S. Pat. No. 5,804,293, Examples 1 to 110, or in the Examples of U.S. Pat. No. 4,892,779, modified such that the nitrile polymer is included as an ingredient in the coating compositions described in these Examples.

Preferred textile materials are natural, synthetic and semi-synthetic materials. Examples of preferred natural textile materials include wool, silk, hair and cellulosic materials, particularly cotton, jute, hemp, flax and linen. Examples of preferred synthetic and semi-synthetic materials include polyamides, polyesters, polyacrylonitriles and polyurethanes.

Preferably the nitrile polymer is obtainable by polymerisation of one or more olefinically unsaturated nitrile monomers, optionally in the presence of olefinically unsaturated monomers which are free from nitrile groups. More preferably the water-dissipatable nitrile polymer has been obtained from the polymerisation of acrylonitrile and/or methacrylonitrile with one or more olefinically unsaturated monomers having water dispersing groups, optionally in the presence of one or more olefinically unsaturated monomers which are free from water dispersing groups.

The nitrite monomers may be chemically different (e.g acrylonitrile and methacrylonitrile) or they may be the same (e.g methacrylonitrile may be the only nitrile monomer in the nitrite polymer).

Preferably the nitrite polymer comprises 10 to 60%, more preferably 20 to 50% w/w of a nitrite monomer. The percentage nitrite monomer in the polymer is calculated on a weight basis by dividing the total weight of nitrite monomers used to make the polymer by the total weight of all monomers used to make the polymer and multiplying the resultant figure by 100.

Preferably the nitrite polymer has a number average molecular weight (Mn) of less than 20,000. The Mn of the nitrite polymer may be measured by gel permeation chromatography ("gpc").

The gpc method used for determining Mn preferably comprises applying the nitrite polymer to a chromatography column packed with cross-linked polystyrene/divinyl benzene, eluting the column with tetrahydrofuran at a temperature of 40° C. and assessing the Mn of the nitrite polymer compared to a number of a polystyrene standards of a known Mn. Suitable cross-linked polystyrene/divinyl benzene chromatography columns are commercially available from Polymer Laboratories.

If the gpc method for determining Mn does not work for any reason, for example the nitrite polymer has an unexpected interaction with the gpc column and so gives an unrealistic result, the Mn may be determined using alternative methods, for example by vapour phase osmometry.

The nitrite polymer preferably has an acid value of from 0 to 750 mgKOH/g, more preferably 0 to 450 mgKOH/g, especially 0 to 225 mgKOH/g.

The water-dissipatable polymer preferably carries water-dispersing groups to provide the facility of self-dispersibility or solubility in water. The dispersing groups may be ionic, non-ionic or a mixture of ionic and non-ionic dispersing groups. Preferred ionic dispersing groups include cationic quaternary ammonium groups and acid groups, for example phosphoric acid groups, sulphonic acid groups and carboxylic acid groups.

The dispersing groups may be incorporated into the nitrile polymer in the form of monomers or oligomers bearing the appropriate dispersing group. One may also react a nitrite polymer that is not water-dissipatable with monomers or oligomers which make the nitrite polymer water-dissipatable.

The acid groups may be subsequently, or during formation of the polymer, fully or partially neutralised with a base containing a cationic charge to give a salt. If acid dispersing groups are used in combination with a non-ionic dispersing group, neutralisation may not be required. The conversion of any free acid groups into the corresponding salt may be effected during the preparation of the nitrile polymer and/or during the preparation of a solution or dispersion of the nitrile polymer.

Preferably the base used to neutralise any acid dispersing groups is ammonia, an amine or an inorganic base. Suitable amines include tertiary amines, for example triethylamine or triethanolamine. Suitable inorganic bases include alkaline hydroxides and carbonates, for example lithium hydroxide, sodium hydroxide, or potassium hydroxide. A quaternary ammonium hydroxide, for example $N^+(CH_3)_4OH^-$, can also be used. Generally a base is used which gives the required counter ion desired for the composition which is prepared from the nitrile polymer. For example, suitable counter ions include $Li^+$, $Na^+$, $K^+$, $NH_4^+$ and substituted ammonium salts (including tetra substituted amines, e.g. $(CH_3)_4N^+$).

Non-ionic dispersing groups may be in-chain, pendant or terminal groups. Preferably non-ionic dispersing groups are pendant polyoxyalkylene groups, more preferably polyoxyethylene groups. The non-ionic groups may be introduced into the nitrile polymer in the form of a compound bearing non-ionic dispersing groups and at least one (although preferably only one) copolymerisable olefinically unsaturated group.

The nature and level of dispersing groups in the nitrile polymer influences whether a solution, dispersion, emulsion or suspension is formed on dissipation of the nitrile polymer.

The dispersing group content of the nitrile polymer may vary within wide limits but is preferably sufficient to enable the nitrile polymer to form stable compositions in water and aqueous media. Preferably the monomer bearing the dispersing group comprises 1–40%, more preferably 5–35% by weight of the total weight of monomers used to make the nitrile polymer.

The nitrile polymer may be prepared in a conventional manner by polymerising nitrile(s) and the olefinically unsaturated monomers. Temperatures of from 20° C. and 180° C. are preferred. The polymerisation may be continued until reaction between the monomers is complete.

In one embodiment the nitrile polymer may be prepared by polymerising a nitrile monomer, an oligomer having water dispersing groups and one olefinically unsaturated terminal group in the presence of one or more olefinically unsaturated monomers which are free from water dispersing groups and/or olefinically unsaturated monomers having water dispersing groups. Alternatively a nitrile oligomer which is free from water dispersing groups may be polymerised in the presence of one or more olefinically unsaturated monomers having water dispersing groups.

Preferred polymerisation methods include solution polymerisation, emulsion polymerisation, suspension polymerisation and solution/dispersion polymerisation, such general methods are well known in the art.

If desired an initiator may be used to assist nitrile polymer formation. Suitable initiators are free-radical generators. Examples of catalysts include azobis compounds, peroxides, hydroperoxides, redox catalysts, etc., for example, potassium persulfate, ammonium persulfate, tert-butyl peroctoate, benzoyl peroxide, isopropyl percarbonate, 2,4-dichlorobenzoyl peroxide, methyl ethyl ketone peroxide, cumene hydroperoxide, dicumyl peroxide, azobisisobutyronitrile, azobis(2-amidino-propane) hydrochloride and the like.

Typically 0.05 to 5% by weight of initiator is used relative to the total weight of the monomers. Preferably the polymerisation is performed in the presence of an emulsifying agent.

The Mn of the nitrile polymer may be controlled by the addition of chain transfer agents and/or through the adjustment of the ratio of the concentration of monomers relative to the concentration of initiator during the course of the polymerisation. Typical chain transfer agents are thiols, halocarbons and cobalt macrocycles.

The nitrile polymer is preferably purified before it is used, for example the nitrile polymer dissipated in water may be purified by ion-exchange, filtration, reverse osmosis, dialysis, ultra-filtration or a combination thereof. In this way one may remove co-solvents used for the polymerisation, low molecular weight salts, impurities and free monomers Preferred olefinically unsaturated nitrile monomers include acrylonitrile, methacrylonitrile, allyl cyano acetate, 2-cyano ethyl acetate, allyl cyanide, alkyl α-cyanoacrylates, especially methyl-α-cyanoacrylates, cyano-N-vinyl acetamide, allyl oxy propionitrile, N,N-diallyl amino acetonitrile, N,N-diallyl amino propionitrile, cinnamonitrile, 2-phenyl-1,1-dicyanoethylene, crotononitrile, 1 and 2-cyano1,3-butadienes especially 1 cyanoprene, fumaronitrile, vinylidene cyanide, 2-cyano ethyl methacrylate, vinyl benzyl cyanide, cyano ethoxy ethyl acrylate and 4-cyanostyrene. Acrylonitrile and methacrylonitrile are especially preferred.

Preferred olefinically unsaturated monomers providing ionic dispersing groups include acrylic acid, methacrylic acid, itaconic acid, maleic acid, monoalkyl itaconates (for example, monomethyl maleate, monoethyl maleate, monobutyl maleate and monooctyl maleate), citraconic acid, styrenesulfonic acid, vinylbenzylsulfonic acid, vinylsulfonic acid, acryloyloxyalkyl sulfonic acids (for example, acryloyloxymethyl sulfonic acid, acryloyloxyethyl sulfonic acid, acryloyloxypropyl sulfonic acid and acryloyloxybutyl sulfonic acid), methacryloyloxymethyl sulfonic acid, methacryloyloxyethyl sulfonic acid, methacryloyloxypropyl sulfonic acid and methacryloyloxybutyl sulfonic acid), 2-acrylamido-2-alkylalkane sulfonic acids (for example, 2-acrylamido-2-methylethanesulfonic acid, 2-acrylamido-2-methylpropanesulfonic acid and 2-acrylamido-2-methylbutane sulfonic acid), 2-methacrylamido-2-alkylalkane sulfonic acids (for example, 2-methacrylamido-2-methylethanesulfonic acid, 2-methacrylamido-2-methylpropanesulfonic acid and 2-methacrylamino-2-methylbutanesulfonic acid), mono-(acryloyloxyalkyl) phosphates (for example, mono(acryloyloxyethyl)phosphate and mono(3-acryloyloxypropyl)phosphates) and mono (methacryloyloxyalkyl)phosphates (for example, mono (methacryloyloxyethyl)phosphate and mono(3-methacryloyloxypropyl)phosphate).

Preferred olefinically unsaturated monomers providing non-ionic dispersing groups include alkoxy polyethylene glycol (meth)acrylates, preferably having a number average molecular weight of from 350 to 2000. Examples of such monomers which are commercially available include ω-methoxypolyethylene glycol acrylate (mean polymerisation degree of polyethylene glycol is about 9) and diethylene glycol vinyl ether. Preferred olefinically unsaturated monomers which are free from dispersing groups include alkyl (meth)acrylates, optionally substituted styrenes, methacrylamides, allyl compounds, vinyl ethers, vinyl ketones, vinyl halides, olefins and unsaturated nitriles.

Preferred alkyl(meth)acrylates contain less than twenty carbon atoms. Examples include methyl acrylate, ethyl acrylate, n-propyl acrylate, isopropyl acrylate, n-butyl acrylate, isobutyl, sec-butyl acrylate, amyl acrylate, hexyl acrylate, 2-ethylhexyl acrylate, octyl acrylate, tert-octyl acrylate, 2-phenoxyethyl acrylate, 2-chloroethyl acrylate, 2-bromoethyl acrylate, 4-chlorobutyl acrylate, cyanoethyl acrylate, 2-acetoxyethyl acrylate, dimethylaminoethyl acrylate, benzyl acrylate, methoxybenzyl acrylate, 2-chlorocyclohexyl acrylate, acylate, cyclohexyl acylate, furfuryl acrylate, tetrahydrofurfuryl acrylate, phenyl acrylate, hydroxyethyl(methyl)acrylate, hydroxypropyl (meth) acrylate, 5-hydroxypentyl acrylate, 2,2-dimethyl-3-hydoxypropyl acrylate, 2-methoxyethyl acrylate, 3-methoxybutyl acrylate, 2-ethoxyethyl acrylate, 2-isopropoxyethyl acrylate, 2-butyoxyethyl acrylate, 2-(2-methoxyethoxy)ethyl acrylate, 2-(2-butoxyethoxy)ethyl acrylate, 1-bromo-2-methoxyethyl acrylate, 1,1-dichloro-2-ethoxyethyl acrylate, methyl methacrylate, ethyl methacrylate, n-propyl methacrylate, isopropyl methacrylate, n-butyl methacrylate, isobutyl methacrylate, sec-butyl methacrylate, amyl methacrylate, hexyl methacrylate, cyclohexyl methacrylate benzylmethacrylate, chlorobenzyl methacrylate, octyl methacrylate, N-ethyl-N-phenylaminoethyl methacrylate, 2-(3-phenylpropyloxy) ethyl methacrylate, dimethylaminophenoxyethyl methacrylate and furfuryl methacrylate.

Preferred optionally substituted styrenes include styrene, methylstyrene, dimethylstyrene, trimethylstyrene, ethylstyrene, diethylstyrene, isopropylstyrene, butylstyrene, hexylstyrene, cyclohexylstyrene, decylstyrene, chloromethylstyrene, trifluoromethylstyrene, ethoxymethylstyrene, acetoxymethylstyrene, methoxystyrene, 4-methoxy-3-methylstyrene, dimethoxystyrene, chlorostyrene, dichlorostyrene, trichlorostyrene, tetrachlorostyrene, pentachlorostyrene, bromostyrene, dibromostyrene, iodostyrene, trifluorostyrene and 2-bromo-4-tri-fluoromethylstyrene.

Preferred methacrylamides contain less than 12 carbon atoms. Examples include methylmethacrylamide, tert-butylmethacrylamide, tert-octylmethacrylamide, benzylmethacrylamide, cyclohexylmethacrylamide, phenylmethacrylamide, dimethylmethacrylamide, dipropylmethacrylamide, hydroxyethyl-N-methylmethacrylamide, N-methylphenylmethacrylamide, N-ethyl-N-phenylmethacrylamide and methacrylhydrazine.

Preferred allyl compounds include allyl acetate, allyl caproate, allyl caprylate, allyl laurate, allyl palmitate, allyl stearate, allyl benzoate, allyl acetoacetate, allyl lactate, allyloxyethanol, allyl butyl ether and allyl phenyl ether.

Preferred vinyl ethers contain less than 20 carbon atoms. Examples include methyl vinyl ether, butyl vinyl ether, hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether and dimethylaminoethyl vinyl ether.

Preferred vinyl ketones contain less than 12 carbon atoms. Examples include methyl vinyl ketone, phenyl vinyl ketone and methoxyethyl vinyl ketone.

Preferred vinyl halides include vinyl chloride, vinylidene chloride and chlorotrifluoro ethylene.

Preferred olefins include unsaturated hydrocarbons having less than 20 carbon atoms. Examples include dicyclopentadiene, ethylene, propylene, 1-butene, 1-pentene, 1-hexene, 4-methyl-1-pentene, 1-heptene, 1-octene, 1-decene, 5-methyl-1-nonene, 5,5-dimethyl-1-octene, 4-methyl-1-hexene, 4,4-dimethyl-1-pentene, 5-methyl-1-hexene, 4-methyl-1-heptene, 5-methyl-1-heptene, 4,4-dimethyl-1-hexene, 5,5,6-trimethyl-1-heptene, 1-dodecene and 1-octadecene.

The preferred olefinically unsaturated monomers which are free from dispersing groups are the alkyl (meth)acrylates containing less than 20 carbon atoms, especially those specifically listed above.

Preferred methods for coating or impregnating the substrate with the nitrile polymer include, for example, dip coating, reverse roller coating, K-bar coating, spraying and ink-jet printing. The substrate may be coated with a plurality of layers, each layer comprising either the same or a different composition.

When the substrate is coated or impregnated with the nitrile polymer in the form of a mixture with a liquid medium it is preferred that the coated or impregnated substrate is dried before ink is applied. Any suitable drying method may be used, for example hot air drying.

Preferably the substrate is obtainable by impregnating or coating with a composition comprising a water dissipatable nitrile polymer having a Mn of less than 25,000 comprising 5 to 70% w/w of nitrile monomers, a liquid medium and optionally a binder. The liquid medium preferably comprises water or a mixture of water and organic solvent. Preferred organic solvents are water-miscible organic solvents, water-immiscible organic solvents and mixtures thereof.

Suitable water-miscible organic solvents include $C_{1-5}$-alkanols, e.g. methanol, ethanol, n-propanol, isopropanol, n-butanol, sec-butanol, tert-butanol and isobutanol; amides, e.g. dimethylformamide and dimethylacetamide; ketones and ketone alcohols, e.g. acetone and diacetone alcohol; $C_{2-4}$-ether, e.g. tetrahydrofuran and dioxane; alkylene glycols or thioglycols containing a $C_2$–$C_6$ alkylene group, e.g. ethylene glycol, propylene glycol, butylene glycol, pentylene glycol and hexylene glycol; poly(alkylene-glycol)s and thioglycol)s, e.g. diethylene glycol, thiodiglycol, polyethylene glycol and polypropylene glycol; polyols, e.g. glycerol and 1,2,6-hexanetriol; and lower alkyl glycol and polyglycol ethers, e.g. 2-methoxyethanol, 2-(2-methoxyethoxy)ethanol, 2-(2-ethoxyethoxy)ethanol, 2-(2-butoxyethoxy)ethanol, 3-butoxypropan-1-ol, 2-[2-(2-methoxyethoxy)-ethoxy] ethanol, 2-[2-(2-ethoxyethoxy)ethoxy]-ethanol; cyclic esters and cyclic amides, e.g. optionally substituted pyrrolidones; sulpholane; and mixtures containing two or more of the aforementioned water-miscible organic solvents. Preferred water-miscible organic solvents are $C_{1-6}$-alkyl mono ethers of $C_{2-6}$-alkylene glycols and $C_{1-6}$-alkyl mono ethers of poly($C_{2-6}$-alkylene glycols).

Suitable water-immiscible organic solvents include aromatic hydrocarbons, e.g. toluene, xylene, naphthalene, tetrahydronaphthalene and methyl naphthalene; chlorinated aromatic hydrocarbons, e.g. chlorobenzene, fluorobenzene, chloronaphthalene and bromonaphthalene; esters, e.g. butyl acetate, ethyl acetate, methyl benzoate, ethyl benzoate, benzyl benzoate, butyl benzoate, phenylethyl acetate, butyl lactate, benzyl lactate, diethyleneglycol dipropionate, dimethyl phthalate, diethyl phthalate, dibutyl phthalate, di (2-ethylhexyl) phthalate; alcohols having six or more carbon atoms, e.g. hexanol, octanol, benzyl alcohol, phenyl ethanol, phenoxy ethanol, phenoxy propanol and phenoxy butanol; ethers having at least 5 carbon atoms, preferably $C_{5-14}$ ethers, e.g. anisole and phenetole; nitrocellulose, cellulose ether, cellulose acetate; low odour petroleum distillates; turpentine; white spirits; naphtha; isopropylbiphenyl; terpene; vegetable oil; mineral oil; essential oil; and natural oil; and mixtures of any two or more thereof.

The composition may be prepared by mixing the nitrile polymer and liquid medium. Suitable mixing techniques are well known in the art, for example agitation, ultrasonication or stirring of the components.

The nitrile polymer may be present in the composition in any form suitable for application to the substrate, for example the form of a dispersion, emulsion, suspension, solution or a combination thereof.

To achieve a particularly good dispersion additional dispersants may be added. Preferably the dispersant is a surfactant. Preferred surfactants are anionic surfactants such as; sodium dodecyl sulphate, ammonium dodecyl benzene sulphonate, sodium nonoxynyl phosphate, sodium dioctyl sulphosuccinate; nonionic surfactants such as alkyl phenol ethoxylates, alkyl ethoxylates, polyoxyethylene polyoxypropylene block copolymers; cationic surfactants such as; dodecyl trimethyl ammonium bromide, bis(2-hydroxyethyl) tallow amine; and amphoteric surfactants such as ammonium cocoaminopropionamide. The choice of dispersants will be governed by many factors including: the nitrile polymer chosen and its physical/chemical properties; the amount of polymer to be dispersed; and the nature of the liquid medium. For an optimum dispersion it may be necessary to use a mixture of several dispersants.

The binder is preferably a polymeric or polymerisable binder, more preferably a water-soluble or water-dissipatable polymeric or polymerisable binder optionally containing porous inorganic particles e.g. alumina (especially boehmite) or siliceous particles, especially particulate amorphous precipitated silica having a calculated multimodal particle size distribution wherein the particle sizes at the modes are less than 10 micrometers, as described in U.S. Pat. No. 5,804,293, and the siliceous particles referred to in PCT/US96/19361, page 9, lines 21 to 29 which are incorporated herein by reference thereto. These particles improve absorbency of the substrate for inks, resulting in better wet and rub fastness properties for the substrate. Optionally the porous inorganic particles are incorporated into the substrate as a component of the binder.

Preferred water-soluble binders include starches, preferably hydroxy alkyl starches, for example hydroxyethyl-starch; celluloses, for example cellulose, methylcellulose, hydroxyethylcellulose, hydroxypropylcellulose, hydroxyethyl methyl cellulose and carboxymethlycellulose (and salts thereof) and cellulose acetate butyrate; gelatin; gums, for example guar, xanthan gum and gum arabic; polyvinylalcohol; polyvinylphosphate; polyvinylpyrrolidone; polyvinylpyrrolidine; polyethylene glycol; hydrolysed polyvinylacetate; polyethylene imine; polyacrylamides, for example polyacrylamide and poly(N,N-dimethyl acrylamide); acrylamide-acrylic acid copolymers; polyvinylpyridine; polyvinylphosphate; vinylpyrrolidone-vinyl acetate copolymers; vinyl pyrrolidone-styrene copolymers; polyvinylamine; poly(vinyl pyrrolidonedialkylaminoalkyl alkylacrylates), for example poly vinylpyrrolidone-diethylaminomethylmethacrylate; acid-functional acrylic polymers and copolymers, for example poly(meth)acrylic acid and copolymers of (meth)acrylic acid and other (meth) acrylate monomers; amine-functional acrylic polymers and copolymers, for example polydimethylaminoethyl-methacrylate; acid or amine functional urethane polymers, preferably those containing dimethylolpropanoic acid and/or pendant or terminal polyethylene glycols; ionic polymers, especially cationic polymers, for example poly (N,N-dimethyl-3,5-dimethylene piperidinium chloride); polyesters, preferably those which carry water-solubilising groups, especially acid groups, for example polyesters obtainable by polymerising a polyol with sodiosulphoisophthalic acid.

Preferred water-dissipatable binders are water-dissipatable polymers, more preferably latex polymers, for example cationic, non-ionic and anionic styrene-butadiene latexes; vinyl acetate-acrylic copolymer latexes; acrylic copolymer latexes which carry quaternary ammonium groups, for example a polymethylacrylate trimethylammonium chloride latex; and dispersions of poly(acrylate), poly (methacrylate), polyester, polyurethane or vinyl polymers and copolymers thereof. The polymer dispersions are preferably prepared by emulsion, suspension, bulk or solution polymerisation followed by dispersion into water.

The binder may comprise a single binder or comprise a mixture of two or more binders, especially the preferred binders described above. The binder may also be a Quikote™ coating material available from PPG Industries Inc. Colour bleed in the resultant substrate can be reduced or even eliminated if the binder contains (1) water-soluble film-forming organic polymer which is substantially free of onium groups, and (2) a water-soluble or water-dispersible onium addition polymer consisting essentially of onium-containing mer units. Preferably the weight ratio of the binder to the nitrile polymer is from 99:1 to 1:99, more preferably from 80:20 to 20:80.

A preferred composition suitable for coating or impregnating the substrate comprises:

(a) from 0.01 to 99.99, more preferably 1 to 99.98, parts of the nitrile polymer;

(b) from 0 to 99.98 , more preferably 1 to 10, parts of a binder; and (c) from 0.01 to 99.99, more preferably 0.1 to 50, parts of a liquid medium.

wherein all parts are by weight and the total number of parts (a)+(b)+(c)=100.

The media may also comprise other additives including, but not limited to, silica gels, aluminas, antioxidants, UV absorbers, mordants especially cationic mordants more especially cationic polymers.

The composition for coating or impregnating the substrate is preferably colourless, weakly coloured or white.

According to a second aspect of the invention there is provided a composition comprising a water-dissipatable nitrile polymer having a Mn of less than 25,000 comprising 5 to 70% w/w of a nitrile monomer and a liquid medium.

The composition is preferably colourless or weakly coloured, preferably colourless. The liquid medium is preferably as described above in relation to the first aspect of the invention. Preferably the liquid medium used in the colourless or weakly coloured composition comprising the nitrile polymer comprises water, more preferably water and a water-miscible organic solvent. Optionally it further comprises a binder more preferably a binder as described in the first aspect of the present invention.

Preferably a colourless or weakly coloured composition according to the aspect of the invention comprises:

(a) from 0.01 to 99.8 parts of a water-dissipatable nitrile polymer having a Mn of less than 25,000 comprising 5 to 70% w/w of nitrile monomers;

(b) from 0 to 99.7 parts of a binder;

(c) from 0.01 to 99.98 parts of organic solvent; and (d) from 0.01 to 99.98 parts water;

wherein all parts are by weight and the total number of parts (a)+(b)+(c)+(d)=100.

According to a third aspect of the present invention there is provided a process for printing an image on a substrate comprising applying thereto an ink containing a colorant by means of an ink-jet printer such that the colorant, when situated on the substrate, is in contact with a water-dissipatable nitrile polymer having a Mn of less than 25,000 comprising 5 to 70% w/w of nitrile monomers.

Preferably the substrate is as preferred in the fist aspect of the invention. In this third aspect of the invention, an ink-jet printer preferably applies the ink to the substrate in the form of droplets that are ejected through a small orifice onto the substrate. Preferred ink-jet printers are piezoelectric ink-jet printers and thermal ink-jet printers. In thermal ink-jet printers, programmed pulses of heat are applied to the ink composition of the third aspect in a reservoir by means of a resistor adjacent to the orifice, thereby causing the ink or the colourless or weakly coloured composition to be ejected in the form of small droplets directed towards the substrate during relative movement between the substrate and the orifice. In piezoelectric ink-jet printers the oscillation of a small crystal causes ejection of the ink or the composition of the third aspect from the orifice. In WO 00/48938 and WO 00/55089 a new form of piezoelectric technology is described where ink is ejected from an ink ejection nozzle chamber utilizing an electromechanical actuator connected to a paddle or plunger which moves towards the ejection nozzle of the chamber for the ejection of drops of ink from the ejection nozzle chamber.

Preferably the process of the third aspect of the present invention further comprises the step of applying the nitrile polymer to the substrate by means of an ink-jet printer. The nitrile polymer is preferably applied to the substrate before, during or after application of the ink to the substrate, more preferably before application of the ink to the substrate.

The ink may be any ink suitable for application by an ink-jet printer.

The colorant used in the ink is preferably yellow, magenta, cyan or black.

The colorant may be a single coloured component or a mixture of coloured components, for example it may be a mixture of different dyes and/or pigments. By using a mixture of different dyes as the colorant one may achieve greater flexibility in colour of the ink.

The colorant is preferably an anionic dye, more preferably a cationic dye, especially a disperse dye. These preferences arise because the increase in light fastness is better with cationic dyes than anionic dyes, and disperse dyes are better than cationic and anionic dyes. Optionally the colorant is insoluble in the nitrile polymer, although preferably the colorant is preferably soluble in the nitrile polymer. Suitable disperse dyes are soluble in organic solvents and insoluble in water. Preferred disperse dyes are free from sulpho and carboxy groups.

Useful classes of colorants include anthraquinones, phthalocyanines, pyrrolines, triphenodioxazines, methines, benzodifuranones, coumarins, indoanilines, benzenoids, xanthenes, phenazines, solvent soluble sulphur dyes, quinophthalones, pyridones, aminopyrazoles, pyrollidines, styrylics and azoics. Examples of preferred azoics are monoazo, disazo and trisazo disperse dyes each, of which are optionally metallised and solvent soluble dyes; especially preferred azoics contain heterocyclic groups. The Colour Index International lists suitable disperse and solvent soluble dyes, examples of which include Solvent Blue 63, Disperse Blue 24, Solvent Black 3, Solvent Black 35 and Disperse Red 60.

Further examples of disperse dyes are given in the Colour Index, 3rd Edition, Volume 2, pages 2483 to 2741 and further examples of solvent soluble dyes are given in Volume 3, pages 3566 to 3647 and each of these dyes is included herein by reference thereto.

The viscosity of the ink is preferably less than 20 cp, more preferably less than 15 cp, especially less than 10 cp, at 20 °C.

Preferably the ink has been filtered through a filter having a mean pore size less than 10 $\mu$m, more preferably less than 5 $\mu$m, especially less than 1 $\mu$m. In this way particulate matter that could otherwise block the printer-head is removed.

A fourth aspect of the present invention provides a substrateas described in the first aspect of the invention printed by means of a process as described in the third aspect of the invention.

Substrates of the present invention when printed provide sharp images with excellent print quality and little if any bleed between colours printed side by side. Furthermore an image on the substrate shows good storage stability, wet fastness and fastness to both acidic and alkaline highlighter pens. In particular an image printed on the substrate shows excellent light-fastness.

The invention is further illustrated by the following Examples in which all parts are by weight.

EXAMPLE 1

Stage A—Preparation of Inks

Ink 1
C.I.Basic Red 1 (1 part)
2-pyrrolidone (99 parts)
Ink 2
Dye of Formula (2) (0.15 parts)
tetrahydrofuran (99.85 parts)

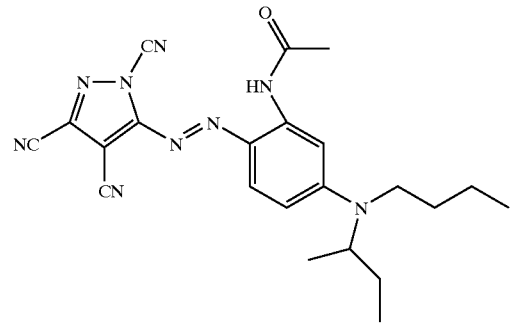

Formula (2)
The dye of Formula (2) was prepared as described in Stage 2, Example 1 of WO 98/14523.
Ink 3
Direct Yellow 86 (2.3 parts)
2-pyrolidone (97.7 parts)

Stage B—Preparation of Water-Dissipatable Acrylonitrile Polymer

Acrylonitrile Polymer 1-S/2-EHA/AN/MAA/AA=19.5/35/40/3.7511.25
Acrylonitrile Polymer Was Prepared as Follows:

| Materials | Weight (g) |
| --- | --- |
| De-ionised Water | 250 |
| Monomer Feed | |
| Styrene ("S") | 65.52 |
| 2-Ethylhexylacrylate ("2-EHA") | 97.2 |
| Acrylonitrile ("AN") | 123.4 |
| Methacrylic Acid ("MAA") | 11.6 |
| Acrylic Acid ("AA") | 3.85 |
| Monomer Shot | |
| Styrene | 7.28 |
| 2-Ethylhexylacrylate | 10.8 |
| Initiator Feed | |
| Ammonium persulphate (APS) | 2.984 |
| De-ionised water | 72 |
| Sodium lauryl sulphate | 4.48 |
| Initiator Shot | |
| Ammonium persulphate | 0.746 |
| De-ionised water | 18 |
| Sodium lauryl sulphate | 1.12 |
| Burn-up Co-initiator | |
| Ascorbic acid | 2.243 |
| De-ionised water | 42.58 |
| Burn-up Initiator | |

-continued

| Materials | Weight (g) |
|---|---|
| t-Butyl hydrogen peroxide (70% solids) | 3.20 |
| De-ionised water | 41.62 |
| Odour reducer | |
| Hydrogen peroxide solution (30% solids) | 2.49 |

Procedure

The monomer shot was added to the water at 80° C. under a nitrogen atmosphere with continuous stirring. After 5 minutes the initiator shot was added to seed the polymerisation and the mixture was stirred for a further 15 minutes before the monomer and initiator feeds were added over 90 minutes, maintaining the temperature of the reaction at 80–83° C. After addition of the monomer and initiator feeds were complete the stirring was continued at 80–83° C. for a further hour. The resultant mixture was cooled to 50° C., at which point the burn-up co-initiator was added dropwise over 30 minutes. The burn-up initiator was added in 3 equal shots at 1, 10 and 20 minutes of the co-initiator addition. The mixture was stirred for a further 30 minutes before hydrogen peroxide solution was added dropwise over 10 minutes. The resultant mixture was cooled and filtered to give Acrylonitrile Polymer 1 having a pH of 7, a solids content of 42%, a viscosity @20° C. of 32 cps, a Mn (polystyrene equivalent) of 17,500 and a particle diameter of 55 nm.

Control Polymer (free from acrylonitrile (S/2-EHA/MAA/AA))

| Materials | Charge (g) |
|---|---|
| Initiator charge | |
| water | 189 |
| Nansa AS40 | 3.95 g in 10 g water |
| APS initiator charge | 0.158 in 5 g water |
| Monomer feed | |
| S | 187.1 |
| 2-EHA | 113.9 |
| MAA | 11.9 |
| AA | 3.95 |
| Surfactant feed | |
| water | 72.1 |
| Nansa AS40 | 15.8 g in 50 g water |
| Initiator feed | |
| APS | 0.7 g in 70 g water |

Procedure

The water (189 g) was added to a reactor and heated to 80° C. with continuous stirring under an atmosphere of nitrogen. The Nansa™ AS40 (a non-ionic surfactant from Albright and Wilson) (3.95 g) was added, followed by the APS initiator charge. 10% of the monomer feed was added and the mixture heated to 85° C. with continuous stirring for 15 minutes. The monomer feed, surfactant feed and initiator feed were added in parallel over 2 hrs maintaining temperature at 85° C. After 2 hrs the initiator burn up was added and the temperature was maintained at 85° C. for 1 hour with agitation. The resultant mixture was cooled and filtered to give the control polymer having a 39% solids content and an average particle diameter of 80.5 nm.

EXAMPLE 1 to 3—Under Printing with Acrylonitrile Polymer 1

Substrates were prepared by coating an aqueous solution of Acrylonitrile Polymer 1 (42% solids content) or the Control Polymer to separate sheets of Champion Datacopy paper using a K-bar #2. The sheets were left to dry for 10 minutes. Inks 1 to 4 were we applied to the sheets and allowed to dry for 24 hours.

After drying for 24 hours, the dyed sheets were half covered and placed in an HPUV accelerated indoor fadeometer. The dyed sheets were exposed for the equivalent of three years based on the standard indoor conditions of 450 lux for 12 hours per day. After fading the sheets were removed and the reflected optical density of the unfaded and faded portions of the sample measured in an X-Rite™938 spectrodensitometer. The percentage of reflected optical density lost was then calculated using the following equation in which ROD means reflected optical density:

$$\% \text{ ROD loss} = \frac{(\text{ROD before exposure} - \text{ROD after exposure})}{\text{ROD before exposure}} \times 100$$

A lower value for %ROD loss indicates higher lightfastness. The results are shown in Table 1.

A comparative sample was prepared where ink 1 was directly coated onto Champion Datacopy paper using the K-bar without Acrylonitrile Polymer 1 being present. The sample was then faded under the same conditions as above and the % ROD loss measured. Other comparative examples were performed in which the inks were applied directly to the paper (i.e. no polymer was used). The results are shown in Table 1.

TABLE 1

| Sample 1 | Polymer | % ROD loss |
|---|---|---|
| Ink 1 | Acrylonitrile Polymer 1 | 35 |
| Ink 1 | None | 70 |
| Ink 1 | Control Polymer | 66 |
| Ink 2 | Acrylonitrile Polymer 1 | 13 |
| Ink 2 | No Polymer | 76 |
| Ink 3 | Acrylonitrile Polymer 1 | 7 |
| Ink 3 | No Polymer | 24 |

As can be seen from Table 1, the % ROD loss was much lower when Acrylonitrile Polymer 1 was used compared to when no polymer was used or a polymer free from acrylonitrile was used.

What is claimed is:

1. A substrate for ink-jet printing with an ink containing a colorant wherein the substrate is coated or impregnated with a water-dissipatable nitrile polymer having a number average molecular weight Mn of less than 25,000 comprising 5–70% w/w of nitrile monomers and acid groups as water dispersing groups characterised in that the colorant in contact with the water-dissipatable nitrile polymer exhibits enhanced light-fastness.

2. A substrate according to claim 1 wherein the acid groups are carboxylic acid groups.

3. A substrate according to either claim 1 or claim 2 wherein the water-dissipatable nitrile polymer has been obtained from the polymerisation of acrylonitrile and/or methacrylonitrile with one or more olefinically unsaturated monomers having water dispersing groups, optionally in the presence of one or more olefinically unsaturated monomers which are free from water dispersing groups.

4. A substrate according to claim 1 which is obtainable by impregnating or coating with a composition comprising a nitrile polymer having a Mn of less than 25,000 comprising 5 to 70% w/w of a water dissipatable nitrile monomer, a liquid medium and optionally a binder.

5. A substrate according to claim 4 wherein the binder is a water-soluble or water-dissipatable polymeric or polymerisable binder.

6. A substrate according to either claim 4 or claim 5 wherein the binder is a water-soluble or water-dissipatable polymeric or polymerisable binder containing porous inorganic particles.

7. A substrate according to claim 1 wherein the substrate is a coated or uncoated paper, overhead projector slide or a textile material.

8. A process for printing an image on a substrate comprising applying to a substrate according to claim 1 an ink containing a colorant by means of an ink-jet printer such that the colorant, when situated on the substrate, is in contact with a said water-dissipatable nitrile polymer whereby said colorant exhibits enhanced light-fastness.

9. A process according to claim 8, which further comprises the step of applying the nitrile polymer by means of an ink-jet printer.

10. A process for printing an image on a substrate comprising applying to a substrate according to claim 2 an ink containing a colorant by means of an ink-let printer such that the colorant when situated on the substrate is in contact with the water-dissipatable nitrile polymer whereby said colorant exhibits enhanced light-fastness.

11. A substrate printed by means of a process as described in claim 8.

12. A substrate according to claim 1 including an ink containing a colorant such that the colorant is in contact with the nitrile polymer.

13. A substrate according to claim 12 wherein the ink is applied to the substrate by an ink-jet printer.

* * * * *

UNITED STATES PATENT AND TRADEMARK OFFICE
CERTIFICATE OF CORRECTION

PATENT NO.   : 6,890,609 B2
DATED        : May 10, 2005
INVENTOR(S)  : Paul Wight et al.

It is certified that error appears in the above-identified patent and that said Letters Patent is hereby corrected as shown below:

Column 1,
Lines 26 and 43, delete "nitrite" and add -- nitrile --.

Column 2,
Lines 1, 5, 6, 7, 8, 12, 14, 17, 20, 26, 30, 44 and 45, delete "nitrite" and add -- nitrile --.

Signed and Sealed this

Twenty-third Day of August, 2005

JON W. DUDAS
*Director of the United States Patent and Trademark Office*